(12) United States Patent
Torriani et al.

(10) Patent No.: US 12,507,819 B2
(45) Date of Patent: Dec. 30, 2025

(54) TUBULAR IMPLEMENT AND METHOD FOR MANUFACTURING A TUBULAR IMPLEMENT

(71) Applicant: Arboloom IP AG, Biel (CH)

(72) Inventors: Laurent Torriani, Lamboing (CH); Carole Chapelat, Biel (CH); Bertrand Jaccoud, Siviriez (CH)

(73) Assignee: ARBOLOOM IP AG, Biel (CH)

( * ) Notice: Subject to any disclaimer, the term of this patent is extended or adjusted under 35 U.S.C. 154(b) by 485 days.

(21) Appl. No.: 17/925,912

(22) PCT Filed: May 25, 2021

(86) PCT No.: PCT/EP2021/063859
§ 371 (c)(1),
(2) Date: Nov. 17, 2022

(87) PCT Pub. No.: WO2021/239711
PCT Pub. Date: Dec. 2, 2021

(65) Prior Publication Data
US 2023/0301449 A1    Sep. 28, 2023

(30) Foreign Application Priority Data

May 26, 2020 (CH) .......................................... 627/20

(51) Int. Cl.
*A47G 21/18* (2006.01)
*B27D 1/00* (2006.01)
(Continued)

(52) U.S. Cl.
CPC ........... *A47G 21/186* (2013.01); *B27D 1/005* (2013.01); *B27D 1/086* (2013.01); *B32B 1/08* (2013.01); *B32B 7/12* (2013.01); *B32B 21/08* (2013.01); *B32B 21/14* (2013.01); *B32B 37/06* (2013.01); *B32B 37/1045* (2013.01);
(Continued)

(58) Field of Classification Search
CPC ........ A47G 21/186; B27D 1/086; B32B 7/12; B32B 21/08; B32B 21/14
See application file for complete search history.

(56) References Cited

U.S. PATENT DOCUMENTS 229,231 A    6/1880  Armanet
1,645,936 A * 10/1927 Schlesinger ........... B27D 1/086
                                                      144/380
(Continued)

FOREIGN PATENT DOCUMENTS

| CN | 102079849 A | 6/2011 |
| CN | 110714363 A | 1/2020 |
| CN | 111231040 A | 6/2020 |
| DE | 4214107 A1  | 11/1993 |

(Continued)

OTHER PUBLICATIONS

Switzerland Search Report dated Sep. 1, 2020, Application No. CH00627/20, 2 pages.
(Continued)

*Primary Examiner* — David R Deal
(74) *Attorney, Agent, or Firm* — Rankin, Hill & Clark LLP

(57) ABSTRACT

A tubular implement, such as a container, in particular a container (pipe for transport) for food or beverages such as a drinking straw, includes a first part having a sheet of wood veneer rolled to form the tubular implement in the form of a cylinder.

7 Claims, 2 Drawing Sheets

(51) Int. Cl.
    *B27D 1/08*     (2006.01)
    *B32B 1/08*     (2006.01)
    *B32B 7/12*     (2006.01)
    *B32B 21/08*     (2006.01)
    *B32B 21/14*     (2006.01)
    *B32B 37/06*     (2006.01)
    *B32B 37/10*     (2006.01)

(52) U.S. Cl.
    CPC .. *A47G 2400/10* (2013.01); *B32B 2307/7265* (2013.01); *B32B 2307/7376* (2023.05); *B32B 2309/12* (2013.01); *B32B 2310/028* (2013.01); *B32B 2597/00* (2013.01)

(56) References Cited

U.S. PATENT DOCUMENTS

| | | | | |
|---|---|---|---|---|
| 2,398,326 A * | 4/1946 | Reeves | ............. | B27D 1/08 |
| | | | | 264/129 |
| 2,452,226 A * | 10/1948 | Cone | ............. | B27B 1/00 |
| | | | | 428/491 |
| 2,458,864 A * | 1/1949 | Lindsay | ............. | B32B 27/00 |
| | | | | 156/224 |
| 3,025,004 A * | 3/1962 | Levi | ............. | B31F 1/205 |
| | | | | 239/33 |
| 3,956,542 A * | 5/1976 | Roberti | ............. | B27D 1/08 |
| | | | | 144/380 |
| 3,963,546 A * | 6/1976 | Roberti | ............. | B27D 1/08 |
| | | | | 144/380 |
| 5,576,082 A * | 11/1996 | Jarrett | ............. | B32B 3/30 |
| | | | | 138/155 |
| 5,746,863 A | 5/1998 | Jarrett | | |
| 10,576,655 B2 | 3/2020 | Andersson et al. | | |
| 2007/0000136 A1 * | 1/2007 | Allen | ............. | B27M 3/24 |
| | | | | 30/322 |
| 2021/0137293 A1 * | 5/2021 | Liao | ............. | B31B 50/592 |

FOREIGN PATENT DOCUMENTS

| | | |
|---|---|---|
| DE | 10 2017 108 583 A1 | 10/2017 |
| FR | 2 323 529 A1 | 4/1977 |
| FR | 3 052 379 A1 | 12/2017 |
| GB | 2 210 016 A | 6/1989 |
| JP | 3221962 U | 7/2019 |
| JP | 3224392 U | 12/2019 |
| JP | 3224567 U | 12/2019 |
| JP | 2020-32015 A | 3/2020 |
| JP | 2021-29400 A | 3/2021 |
| WO | 2005/104920 A1 | 11/2005 |

OTHER PUBLICATIONS

European Office Action dated Mar. 31, 2025, Application No. 21 730 484.9; 7 pages.

* cited by examiner

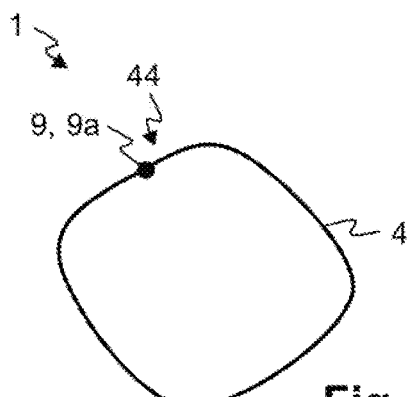
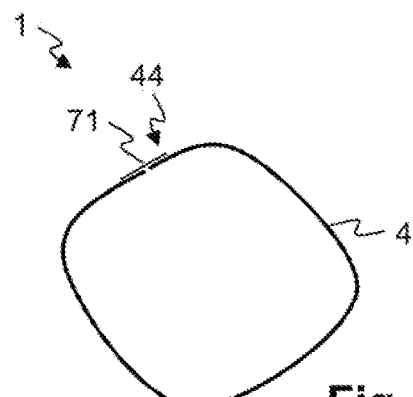
Fig. 9     Fig. 10
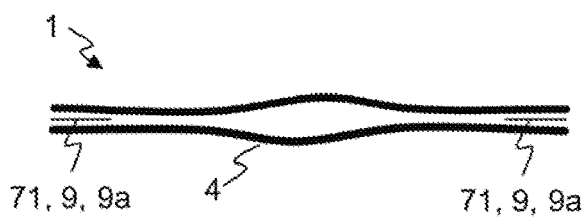
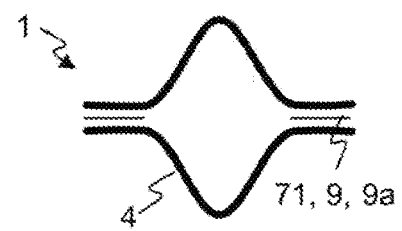
Fig. 11
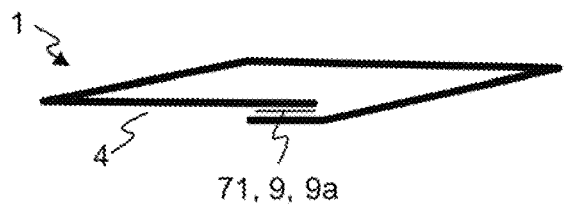
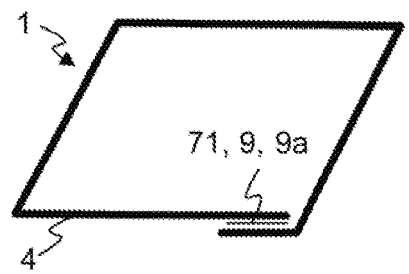
Fig. 12
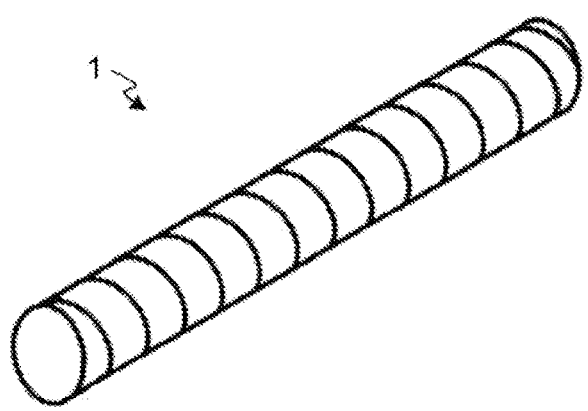
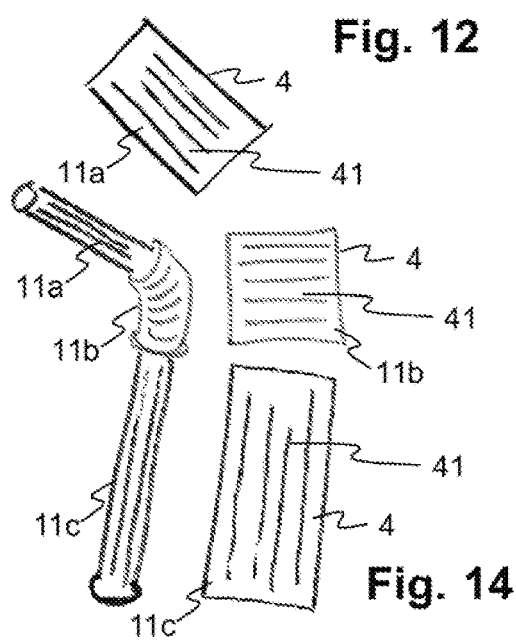
Fig. 13     Fig. 14

TUBULAR IMPLEMENT AND METHOD FOR MANUFACTURING A TUBULAR IMPLEMENT

BACKGROUND OF THE INVENTION

Field of the Invention

The invention relates to the field of containers for packaging, in particular for food and beverages. It relates to a tubular implement, in particular a tubular container, such as a drinking straw, and methods for their manufacturing.

Description of Related Art

Disposable containers, in particular for food and beverages are ubiquitous. Whereas mounds of containers discarded in ancient times, such as the Roman Monte Testaccio, provide historical insights, modern one-way containers have an environmental impact that calls for mitigation. Existing approaches focus on the complete product life cycle, taking into account both production and disposal. It is known to manufacture disposable containers, in particular for food, from materials such as bamboo, wood, straw, etc. Furthermore, it is known to manufacture elongated implements, which may be tubular or not, for example, chopsticks, pencils, cigarette holders and the like of wood. However, their production involves a significant waste of raw material. Especially for single use, disposable implements that used in great numbers, the total amount of waste is significant.

DE 4214107 discloses a wooden drinking straw of circular or rectangular cross-section made of two halves. It has longitudinal notches forming break points for separating the halves. The halves are machined from a piece of wood, creating waste.

DE 102017108583 A1 shows a drinking straw with a hollow cellulose body coated on the inside and outside with an animal or vegetable wax.

JP3221962 discloses a moulding machine for creating wooden hollow pipes, by winding a sliced sheet at a specific angle with respect to the direction of wood grain, producing a drinking straw. Thickness of the wood used is 0.1 to 0.5 mm.

JP3224392 discloses a similar wooden drinking straw, combined with a case for transporting the straw.

JP3224576 discloses a wooden base material wound in an oblique direction to form a drinking straw. Thickness of the wood is 0.12 to 0.18 mm.

CN110714363 discloses a drinking straw made of a biodegradable material, in particular paper made of bamboo pulp. According to one example, wax is applied between two layers of paper.

WO2005104920 discloses a combined chopstick and drinking straw, made of plastic, wood or steel.

JP2020032015 discloses a multilayer paper straw made of paper laminated with polylactic acid resin and having a spirally wound structure.

CN102079849 discloses a biodegradable straw extruded from poly(butylene succhinate) and additional materials.

CN111231040 discloses a manufacturing method in which wood or bamboo veneer is pressed into a semicylindrical shape. Two such parts are glued to another to form a drinking straw.

There is a need for containers and elongated implements that have a smaller environmental impact with regard to existing approaches.

SUMMARY OF THE INVENTION

It is therefore a possible object of the invention to create a tubular implement and a method for manufacturing a tubular implement of the type mentioned initially which overcomes the disadvantages mentioned above.

Another possible object of the invention is to provide a drinking straw with a low environmental footprint.

Another possible object of the invention is to provide a method for shaping a sheet of wood veneer that is suited for manufacturing a tubular implement of the type mentioned initially.

Another possible object of the invention is to provide a method for joining two sections of wood veneer that is suited for manufacturing a tubular implement of the type mentioned initially.

According to a first aspect of the invention, at least one of the objects is achieved by a tubular implement container and a method for manufacturing a tubular implement according to the corresponding claims.

The tubular implement, such as a container (or pipe), in particular a container for food or beverages, includes a first part including a sheet of wood veneer rolled to form the tubular implement in the form of a cylinder. The cylinder can be a circular cylinder or a cylinder with another cross sectional shape. For example, the shape of the cross section can have three, four or more corners, typically rounded corners.

The container can be for transporting food or beverages.

A container creates a partially or fully enclosed space that can be used to contain, store, and transport objects or materials. The present invention is focused on but not necessarily limited to containers that are intended to contain food or beverages.

The container is in particular suited for the permanent or temporary storage or containing food or beverages. It is manufactured of at least a first part including a curved sheet of wood veneer. Optionally the first part can be bonded to a second part.

Manufacturing a large part of the container from wood veneer, preferably in an untreated state, reduces the environmental impact when compared to materials such as plastic or cardboard.

One aspect of the environmental impact is the density of the materials used and the weight of the resulting implements. Veneer can have a density of 0.9 or less, whereas thermoplastic materials like PE or PP have a density above 0.9 and others above 1, and paper or cardboard has a density around 1.2.

Waste is reduced and thus production costs as well. The simple construction allows for fast production and a high throughput.

In embodiments, when the veneer is rolled, and a direction of maximal curvature runs at a right angle to a grain direction of the veneer.

Typically, the direction of maximal curvature is a direction of principal curvature, or simply "principal direction", the other direction of principal curvature, corresponding to a curvature of at least approximately zero, running parallel to the grain direction.

If the maximal curvature runs at a right angle to a grain direction, then structures in the wood that are aligned with the grain are not bent, or hardly at all, which makes the veneer easy to bend, even if it is relatively thick. This in turn makes it possible to use veneer that is relatively thick, that is, up to one or two millimetres, or even more. This again makes it possible to achieve impermeability to liquids, at least for a limited time in some cases, without an additional impermeable layer.

More generally the first part, or sections of the first part, form a wall, or a section of a wall, respectively, of a hollow cylinder, prism or frustum. A frustum is a truncated cone or truncated pyramid. For the cylinder or prism, a base face defining its cross section can be a circle or a polygon. The polygon typically has rounded corners.

This can also be expressed in terms of curvature of the first part: the first part is curved, and for each point on the first part, the direction in which the curvature is maximal, also called principal curvature, is one of two orthogonal principal directions. The principal direction corresponding to the largest curvature is at a right angle to the grain direction of the sheet of veneer In embodiments, a direction of maximal curvature runs in parallel to a grain direction of the veneer. Optionally, an inside of the veneer includes notches or indentations, created by compressing the veneer and acting as fold lines.

In embodiments, two opposing edges of the rolled-up sheet of wood veneer run in parallel to a longitudinal axis of the tubular implement. This longitudinal axis is the axis along which the tubular implement extends, and in the case of a cylindrical implement is parallel to the axis of the cylinder.

This has the effect, compared to a helically wound strip of wood veneer, that if a bonding agent is applied to one or both of the opposing edges, less bonding agent is used. Furthermore, the strength of the structure can be higher and depends less on the quality of the bonding agent. Also, waste can be reduced since rectangular pieces of veneer can be used.

In embodiments, the wood veneer is produced by cutting the veneer with cuts that run in parallel to the grain direction.

In embodiments, the wood veneer is produced in a rotary lathe in which the wood is turned against a blade and peeled off in one continuous or semi-continuous roll. This gives the veneer a regular structure, with the grain of the wood, or grain direction, aligned with the plane of the veneer. This in turn makes it possible that channels in the wood that are designed to transport water are also aligned with the plane of the veneer. Furthermore, rotary cutting returns a high yield. Especially for thin veneer, the wood veneer is cut in the direction of the fibre, like for the planing of wood.

In embodiments, the wood veneer is produced as half round sliced veneer, which has a similar effect as for rotary cut veneer.

In embodiments, the veneer has a thickness between 0.2 millimetres and two millimetres, in particular between 0.3 millimetres and 1.5 millimetres, in particular between 0.6 millimetres and 0.9 millimetres.

In embodiments, the tubular implement has a diameter between three millimetres and five centimetres, in particular between five millimetres and three centimetres, in particular between five millimetres and two centimetres.

In embodiments, the tubular implement has a length of at least twice its diameter.

In embodiments, the tubular implement has a length between three and forty centimetres, in particular between ten and thirty centimetres.

In embodiments, the veneer is made of hardwood.

In embodiments, the veneer is made of wood from coniferous trees, in particular of pine trees, in particular spruce trees. For thin veneer, hardwood is preferable to coniferous woods. For food-contact applications, non-coniferous tree may be preferred. This is because resin present in wood of coniferous trees may disperse into substances such as beverages or foods. In embodiments, locally grown tree species or native species are preferred to reduce environmental impact of the production. In Switzerland, such species are, for example, birch or beech or maple.

With regard to a differentiation between hardwood and softwood, there exist two general types of woody trees:

Gymnosperms (seed plants not flowering), being coniferous (females bearing ovulate cones that release unenclosed seeds at maturity), usually evergreen (gradually shedding foliage, green foliage throughout year), known as softwoods (nonporous, wood typically lighter & softer), with needle-like or scale-like leaves. Examples are: firs, spruces, pines.

Angiosperms (flowering seed plants), being fruit-bearing (enclosing seeds within), usually deciduous (seasonally shedding all foliage, no foliage for part of year), known as hardwoods (wood structure porous & more complex, wood generally harder), with broad leaves. Examples are: hickories, maples, oaks.

In embodiments, the veneer is rolled and no overlap is made at the junction of the two edges of the cylinder. The two edges are joined thanks to a film of thermoplastic: the film overlaps the two edges, on each edge, the film is welded to the veneer and ensures the closing of the cylinder. Thanks to this step, tightness can be achieved.

In embodiments, the veneer is rolled to form at least two layers, in particular at least three layers at each point of the circumference of the cylinder.

In embodiments, the layers are bonded with an additional material acting as a glue and/or acting as a sealant.

In embodiments, the additional material is biodegradable, and food-compatible.

In embodiments, the additional material is bio-based or bio-sourced or generated or produced from wood or wood derivatives.

In embodiments, the additional material is lignin or resin or bone glue.

In embodiments, the additional material is a wax, in particular a wax that is solid at room temperature.

The resin (or the wax) mentioned above can be a naturally occurring resin (or wax), or a synthetic resin (or wax). Naturally occurring resins (or waxes) are preferred for environmental reasons.

In embodiments, the additional material is present along a longitudinal edge region near an outer edge of the rolled-up veneer. This can be as a stripe or line of material, or as dots of material.

In embodiments, the additional material is present along a longitudinal edge region near an inner edge of the rolled-up veneer.

In embodiments, the additional material is present along a longitudinal edge region and covers the edge of the rolled-up veneer. It thereby can cover and block channels exposed at the edge. This in turn prevents liquid from entering the channels and getting soaked up by the wood.

In embodiments the layers are bonded without additional material with friction-welding or ultrasonic welding.

In embodiments, the tubular implement, in particular being a drinking straw, is free from glue between the layers.

In embodiments, the veneer is treated to be under internal pre-stress forces that cause the sheet to remain in a rolled-up configuration in which the layers are forced against one another.

In embodiments, the tubular implement includes two or more sections in which the direction of maximal curvature runs in different directions relative to the grain direction of the respective section. The two or more sections are connected to one another to form a continuous tube. This allows to create, for example, a drinking straw with a bendable middle section joining two axially stiff outer sections.

In embodiments, the tubular implement is a drinking straw, made of a sheet of wood veneer, the veneer having a thickness of less than one millimetre, in particular less than half a millimetre, and being rolled to form a cylinder constituting the drinking straw.

In embodiments, the drinking straw made of veneer has a weight of less than 0.8 grams, or less than 0.6 grams, or less than 0.5 grams, or less than 0.4 grams.

In embodiments, the tubular implement is a chopstick or a handle for a writing implement or a cylindrical packaging tube. Such a packaging tube can be closed at one end or at both ends.

In embodiments, the first part includes only the sheet of wood veneer.

In embodiments, the tubular implement includes a sealing material between two layers of the rolled veneer.

In embodiments, the sheet of wood veneer is laminated or coated with an impermeable layer, in particular a film of a plastic material, and the tubular implement is manufactured by rolling the sheet of laminated or coated wood veneer into a configuration in which the tubular implement is ready to be used.

In embodiments, the sheet of wood veneer is laminated or coated with an impermeable layer, in particular a film of a plastic material, and the container is manufactured by rolling the sheet of laminated or coated wood veneer into a configuration in which the container is ready to be used.

In embodiments, the coating is applied by painting, spraying, or other coating methods, such as curtain coating.

In embodiments, the coating has a thickness between 1 micrometres and 50 micrometres, in particular between 2 and 15 micrometres, in particular of 5 micrometres.

In embodiments, the further layer is impermeable, in particular at least one of impermeable to liquids and impermeable to gasses.

In embodiments, the impermeable layer being impermeable to liquids means that it is—at least for a specified time period—impermeable to water or water-based mixtures, in particular beverages. In embodiments, it can mean that it is impermeable to alcohol based or oil based mixtures, such as perfumes or cosmetic products.

In embodiments, the impermeable layer being impermeable to gasses means that it is impermeable to water vapour.

In embodiments, the first part is laminated with a film of one of cellophane, polyethylene (PE), polypropylene (PP), polylactide (PLA), polyamide (PA).

That is, the film constituting the further layer laminated to the support layer can be one of these materials.

In embodiments, the laminate film has a thickness between 10 micrometres and 100 micrometres, in particular between 20 and 40 micrometres.

In embodiments, the veneer has a thickness between 0.2 millimetres and two millimetres, in particular between 0.6 millimetres and 1.2 millimetres.

In embodiments, the veneer is made of wood from coniferous trees (pinopsidae), in particular of pine trees (pinaceae), in particular spruce trees (*picea*).

In other embodiments, wood of ash trees (fraxininae) or birch trees (betulaceae) is used. Ash wood is flexible and watertight to a certain degree, and in embodiments can be used without an additional impermeable layer. Wood from beech trees (*fagus*) is less watertight especially over time and is preferably used in combination with an impermeable layer. Wood from oak (*quercus*) is mechanically strong but expensive. Wood from maple trees (*acer*) and birch trees (betulaceae) is easy to bend.

In embodiments, the tubular implement is a drinking straw, made of a sheet of wood veneer, the veneer having a thickness of less than one millimetre, in particular less than half a millimetre, and being rolled to form a cylinder constituting the drinking straw.

In embodiments of the drinking straw, the veneer is rolled to form at least two layers, in particular at least three layers at each point of the circumference of the cylinder.

In embodiments of the drinking straw, it is free from glue between the layers.

In embodiments of the drinking straw, the veneer is treated to be under internal pre-stress forces that cause the sheet to remain in a rolled-up configuration in which the layers are forced against one another.

This can be accomplished by wetting the veneer with water or steam, bending the veneer, in particular rolling it, and drying it when in the bent or rolled-up shape.

According to a third aspect of the invention, at least one of the objects is achieved by a method for shaping a tubular implement according to the corresponding claims.

According to a second aspect of the invention, a method for shaping a tubular implement includes the steps of:
 softening the veneer, in particular by applying one or more of heat, steam or a liquid, in particular water, to the veneer;
 rolling the veneer;
 drying the veneer at least partially;
 unrolling the veneer and rolling it up again, such that a longitudinal edge that before unrolling was inside the roll of veneer is on the outside of the roll.

Rolling, unrolling, and rolling in with the formerly outer longitudinal edge now on the inside of the spiral. This creates a pre-stress force in the radial direction that forces the layers of the veneer towards one another.

In embodiments, applying the liquid includes applying it only to one side of the veneer, in particular to the side that is to be oriented towards the outside of the tubular implement.

In embodiments, rolling the veneer includes rolling the veneer around a pin, and then either leaving the pin inside the rolled-up veneer, or removing the pin. In embodiments, the pin has an oval cross section. This can facilitate compression of a bonding section in a region on the pin's circumference where its curvature is smallest.

In embodiments, the method includes the step of applying, before rolling up the veneer again, an additional material acting as a glue and/or acting as a sealant along a longitudinal edge of the veneer.

In embodiments, both the liquid and the additional material are applied, and wherein they are applied to opposite sides of the veneer.

In embodiments, the step of drying the veneer includes curing or melting the additional material, in particular by heating, in particular by means of hot air and/or microwave heating.

In embodiments, the method includes filling the rolled-up veneer with a filler material.

In embodiments, the method includes closing the tubular implement at least at one end.

According to a third aspect of the invention, at least one of the objects is achieved by a method for shaping a sheet of wood veneer according to the corresponding claims.

The method serves for shaping a sheet of wood veneer, in particular for shaping a wall for a container described herein.

Therein, before or in the course of shaping the veneer to form a bend, one or more of the following steps are performed:
  applying pressure to compress part of the veneer only at a side oriented towards an inside of the bend;
  applying a liquid, in particular water only to a side of the veneer oriented towards an outside of the bend.

In embodiments, the pressure is applied with an ultrasound sonotrode, imparting mechanical energy in the form of ultrasonic vibrations to the veneer while compressing it.

In embodiments, applying pressure creates an indentation or notch acting as a crease line or fold line.

In embodiments, the liquid, in particular water, is applied in the form of steam.

Compressing, creasing and/or applying liquid makes it possible to fold the veneer around an angle of more than 90°, more than 120° and up to 180°. A corresponding radius of the fold can be between 2 and 10 millimetres.

According to a fourth aspect of the invention, at least one of the objects is achieved by a method for joining two sections of wood veneer according to the corresponding claims.

In a method for joining two sections of wood veneer, in particular for manufacturing a tubular implement as described herein, at least one of the sections being laminated or coated with a film of material, the method including the steps of:
  placing the two sections against one another, with the film arranged between them;
  bonding the two sections by temporarily softening material of the film, in particular by one or more of
    ultrasonic welding;
    friction welding;
    heating, in particular by irradiation or by contact with a heating element;
    applying a solvent.

In embodiments, in the step of bonding the two sections a pressure between 0.5 and 10 Newton per square millimetre is applied, in particular between 1 and 7 Newton per square millimetre, in particular between 3 and 5 Newton per square millimetre.

In a method for joining two sections of wood veneer, in particular for manufacturing a tubular implement as described herein, the method including the steps of:
  applying a resin in a fluid state to at least one of the two sections;
  placing the two sections against one another, with the film (71) arranged between them;
  hardening the resin.

Hardening the resin can be done by cooling the resin, in particular a naturally occurring resin, after having applied it in a heated state. In other embodiments, in particular for corresponding synthetic resins, hardening or curing is effected by heating or irradiating the resin.

BRIEF DESCRIPTION OF THE DRAWINGS

The subject matter of the invention will be explained in more detail in the following text with reference to preferred exemplary embodiments which are illustrated in the attached drawings, which schematically show:

FIG. 9-10 further ways for bonding two sheets of veneer;
FIG. 11-12 drinking straws in flattened and for-use configuration;
FIG. 13 an implement made of a helically would strip of veneer;
and
FIG. 14 a drinking straw made of different tube sections.

DETAILED DESCRIPTION OF THE INVENTION

In principle, identical or functionally identical parts are provided with the same reference symbols in the figures.

Figure 1:
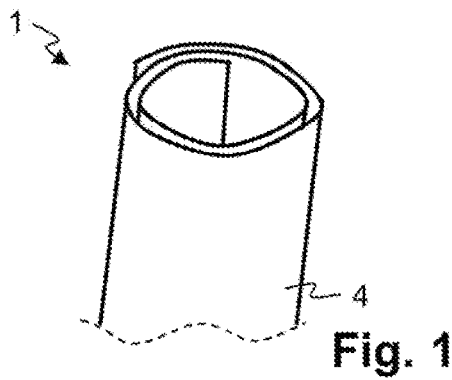
FIG. 1 a tubular drinking straw made of a rolled-up sheet of veneer.

FIG. 1 shows a tubular implement. The following explanations and examples relate mainly to a drinking straw, but can be applied to other implements made of a rolled-up sheet of veneer 4.

The implement shown thus is in the shape of a drinking straw manufactured from a sheet of veneer 4. The veneer 4 is rolled to form a conduit for sucking beverages from a container. The thickness of the veneer 4 typically is between 0.2 millimetres and 1 millimetre. In embodiments, the thickness can be as up to two millimetres. The diameter of the drinking straw typically is between 3 millimetres and 7 millimetres. In embodiments, the layers of the veneer 4 are glued against one another, or bonded by means of an adhesive 9 or a sealing material 9*a* or a film 71. In other embodiments, the layers are not bonded, but lie sufficiently tight against one another to prevent liquid from leaking. This can be achieved by having the drinking straw rolled so as to comprise, at each location of its circumference, at least two layers of veneer 4, or even at least three layers.

In embodiments, the drinking straw is manufactured from veneer of birch wood, with a thickness of 0.6 millimetres.

In embodiments, the drinking straw is manufactured from veneer of maple wood or birch wood, with a thickness of, for example, between 0.2 to 0.6 millimetres.

The diameter of the drinking straw can be around four to six millimetres. Larger diameters are no problem. Smaller diameters can be achieved with suitable care.

In embodiments, the weight of the drinking straw can be less than 0.5 grams or less than 0.4 grams. Comparable drinking straws of Polyethylene weigh more than 0.5 grams, paper straws more than 1.1 grams.

Figure 2:
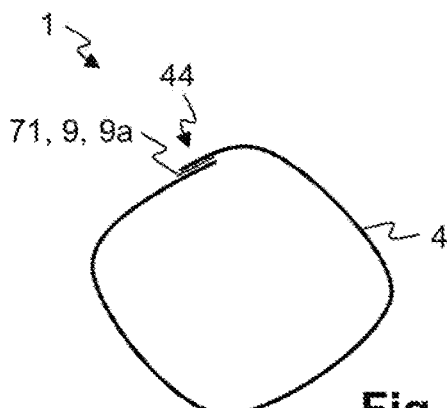
FIG. 2 a cross section thereof.
Figure 3:
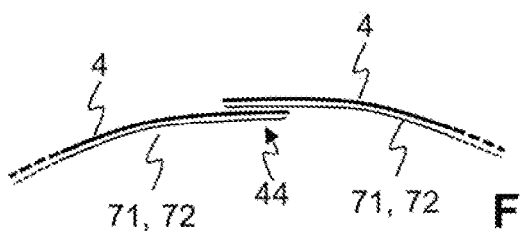
FIG. 3-4 configurations when bonding two sheets of veneer.
Figure 4:
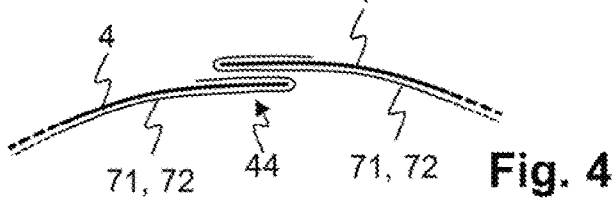

FIG. 2 shows a cross section of the tubular implement, with just an adhesive 9 or sealing material 9*a* or a strip of film 71 in a connection region 44 between the two layers of veneer 4. FIG. 3 shows the connection made using a sheet of veneer 4 with a layer of film 71 laminated onto one side only, and the bonding being between the film 71 and the veneer 4. FIG. 4 shows the same, but with the film 71 folded around at least one of the edges in the connection region 44, so that two layers of film 71 are bonded. The film 71 being folded around the edges prevents liquid from entering the layer of veneer 4 at the edges.

Instead of the film 71 laminated to the veneer 4, a coating 72 can be applied to cover the veneer 4.

Here and some of the other figures, a thin white line is shown between the adhesive 9 and the veneer 4 and the film 71, respectively, or between the film 71 and the veneer 4. This is done in order to allow to visually differentiate these elements. In reality, of course, the adhesive 9 is in close contact with the adjacent parts, and the film 71 or coating 72 with the veneer 4.

The film 71 can be a sheet of a plastic material such as cellophane, polyethylene (PE), polypropylene (PP), polylactide (PLA), polyamide (PA) or the like. Compostable plastics can be used, such as BASF Ecoflex® or Ecovio®. The film 71 constitutes a layer impermeable to liquids. The film 71 is bonded to the veneer 4, without any further material acting as a glue. The bonding can be effected by, for example, ultrasonic welding, friction welding, heating, in particular by irradiation or by contact with a heating element, applying a solvent, etc. . . . to temporarily soften the film 71 while pressing it against the veneer 4.

The adhesive 9 or glue can be based on lignin or bone glue, or another glue that is free of fossil raw materials, or by a glue of another composition. For example, wood glues, in particular glues suited for contact with foodstuff, polyolefin hotmelts, etc.

The adhesive 9 can also serve as a sealing material 9a.

Other materials used as an adhesive 9 and/or sealing material 9a are an animal wax or vegetable based waxes like Paradip Nowax™ from PARAMELT, or cheese wax like Paradip™ from Paramelt oil or resin.

FIGS. 3 to 4 show details of bonding of sheets of veneer 4, in particular in tubular implements 1 as presented herein. As represented in these figures, a layer of film 71 can be laminated on a sheet of veneer 4, in particular when the veneer 4 is in a flat state. This allows to exert high pressures when laminating, and the use of established laminating procedures. Then, when bonding the sheets of veneer 4, the film 71 on one of the sheets is, depending on the embodiment, bonded with the layer of veneer 4 of the other sheet (FIGS. 2 and 3) or with the film 71 of the opposing sheet (FIG. 4). In other embodiments, the film 71 is applied by spraying or painting or otherwise applying the film material in a fluid state. Thereby the veneer 4 is coated with the film 71. Bonding the two layers of film 71 can, depending on the composition of the film 71, be easier to achieve than bonding a film 71 to veneer 4.

The film 71 can be a plastic laminate, in particular a PE laminate. The combination of a sheet of veneer 4 with a PE laminate still can have a significantly lower environmental impact than a implement, e.g., a third of the impact.

Figure 5:
FIG. 5 an un-rolled sheet of veneer with lines of sealing material.
Figure 6:
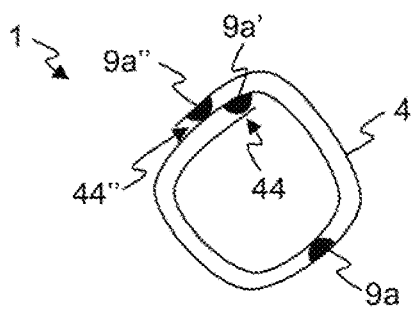
FIG. 6 the sheet of FIG. 3 in a rolled-up configuration.
Figure 7:
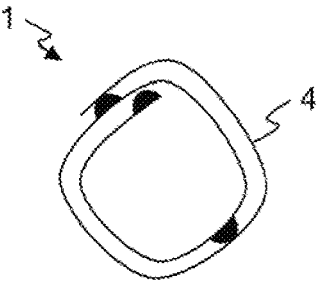
FIG. 7 a sheet with differently placed lines of sealing material in a rolled-up configuration.

FIGS. 5 to 7 show details of bonding layers of a tubular implement 1 such as a drinking straw. Stripes of an adhesive 9 and/or sealing material 9a are applied along a longitudinal line on the veneer 4, parallel to an axis (longitudinal axis) around which the veneer 4 is rolled to form the tubular implement 1 (This axis also is parallel to the viewing direction of FIGS. 2 to 7).

In order to shape the tubular implement 1 of FIG. 6, the flat veneer 4 of FIG. 5 is rolled in the direction of the arrow shown in FIG. 5. In order to facilitate the rolling, the veneer 4 can be moistened or wetted, with water or steam or another liquid. This can be done from both sides, or only from the outside of the future tubular implement 1 (the lower side of the veneer 4 in FIG. 5). In the example of FIG. 5, the sealing material 9a or adhesive 9 can be applied to the side that is not moistened or wetted.

Applying the liquid can be done, for example, by exposing the veneer 4 one to five seconds to steam, or by moistening the veneer 4 with a sponge Rolling can be done around a mandrel or pin, which thereby defines the inner diameter of the tubular implement 1.

After rolling, the veneer 4 can be dried. In a subsequent step, it can be unrolled and rolled up again, beginning with the longitudinal edge that first was at the outside of the roll. This can create a pre-tension that presses the layers of veneer 4 towards one another.

Rolling up the veneer 4 shown in FIG. 5 gives the configuration of FIG. 6.

A first stripe of sealing material 9a is arranged to coincide, after rolling, with an inner connection region 44 along an inner longitudinal edge of the tubular implement 1.

A second stripe of sealing material 9a' is arranged to lie between the inner longitudinal edge and an outer longitudinal edge of the tubular implement 1

A third stripe of sealing material 9a" is arranged to lie in an outer connection region 44" along the outer longitudinal edge of the tubular implement 1.

While the above example shows three lines of adhesive 9 or sealing material 9a, only two or a single one can be present. Depending on the intended use of the implement 1, dots of adhesive can be present instead of lines.

Omitting the third stripe can avoid adhesive 9 or sealing material 9a flowing out from under the veneer 4 and being visible.

In embodiments, with the first stripe omitted, the second stripe can be sufficient to effect sufficient sealing while being distanced from the inside of the drinking straw 1, reducing an effect of dissolved sealing material 9a in fluids contained therein.

In the example of FIG. 7, the sealing material 9a or adhesive 9 is applied to the outside of the veneer 4 being rolled, thus, given the direction of rolling shown in FIG. 5, to the underside of the veneer 4. Here too, only two or one of the stripes of sealing material or adhesive can be present.

In embodiments, one or more stripes of sealing material 9a or adhesive 9 are present on both sides prior to rolling.

The sealing material 9a or adhesive 9 can be cured by heating. This can be done with the same heating process used when drying the tubular implement 1 after rolling.

In embodiments, the sealing material 9a or adhesive 9, and/or the film 71 is applied after rolling.

If the veneer 4 is rolled in parallel to the grain direction, it is generally easier to roll and is mechanically stable. However, it is difficult to bend. In embodiments, creasing lines are created prior to rolling and at an angle, in particular at a right angle, to the grain direction. This can facilitate bending of the resulting tube.

Rolling the veneer in parallel to the grain direction means that the axis of rolling is in parallel to the grain direction. The axis of rolling is normal to the axis of maximal curvature of the resulting tube.

If the veneer 4 is rolled in a direction normal to the grain direction, more humidity and temperature is generally required to effect bending without breaking. A resulting tube is easier to bend. For example, veneer with a thickness of 0.2 mm to 0.3 mm can be rolled in a direction normal to the grain direction when applying water and heat. this is also the case for hardwood such as birch, maple, beech.

FIG. 9-10 show further ways for bonding two sheets of veneer. FIG. 9 shows bonding of two edges, that is, without overlap, as opposed to overlapping bonding as shown in FIG. 2. The bonding is effected by a line of an adhesive 9 or a sealing material 9a. The line of adhesive 9 covers the edge of the rolled-up veneer. If the channels in the wood or formed by the wood cells are open to the edge, then the adhesive by covering the edge blocks the channels, preventing liquid from seeping into the channels. Such a line of adhesive can also be applied to cover the edges in embodiments where the layers of veneer do overlap. Instead of a line, a sequence of dots can be present. FIG. 10 shows bonding of two edges also without overlap, with a film 71 overlapping the two sections being joined. The film is shown on the outside of the tubular implement 1. In other embodiments, the film is on the inside, or both on the inside and the outside.

FIG. 11-12 show drinking straws in flattened configuration (left) and for-use configuration (right). They can be stored in the flattened configuration and by compressing them in the right radial direction be expanded for use, with a larger cross sectional area, forming a tube. An advantage of such shapes is that they do not break when compressed, as a cylindrical straw with a circular cross section would.

In embodiments, compressing such a drinking straw, or generally a tubular implement, takes place after shaping it by applying water and drying it in the for use configuration. Compressing the dry tubular implement builds up elastic forces in the material which will make it unfold when a compressing force is removed.

FIG. 13 show a tubular implement made of a helically would strip of veneer. Depending on the application, it can be sufficient to bond two adjacent layers at only two points, at the two ends of the tube. In embodiments, the veneer is rolled diagonally, that is, the direction of maximal curvature runs diagonally to the grain direction. A strip of veneer can in this manner be rolled to follow a helical path, and is easier to bend than if rolled around the diameter of the resulting tube. The resulting tube is strong and stable with regard to radial forces. In other words, the first part is curved, and a direction of maximal curvature runs diagonally to a grain direction of the veneer.

Depending on the application, such an embodiment can be realised with adhesive being present at just two points, that is, at either end of the helix.

FIG. 14 show a drinking straw made of different tube sections attached to one another to form a tube, together with the constituent pieces of veneer 4 in an unrolled state. It corresponds to a tubular implement 1 with at least a first tubular section 11a in which a direction of maximal curvature runs at a right angle to a grain direction 41 of the veneer 4, and a second tubular section 11b attached to the first, in which a direction of maximal curvature runs in parallel to the grain direction 41 of the veneer 4, and optionally a third tubular section 11c attached to the second, in which the direction of maximal curvature runs at a right angle to a grain direction 41 of the veneer 4. The first and third section are stiff with regard to bending, whereas the second, acting as a coupling piece, can be more easily bent.

In embodiments, the tube is filled to enhance its strength. In others, it is left hollow and can be used as a casing.

Applications of the tubular implement 1 are, for example, as chopsticks, holders for writing implements such as pencils, crayons or pens, holders for cigarettes or cigars, etc.

Figure 8:
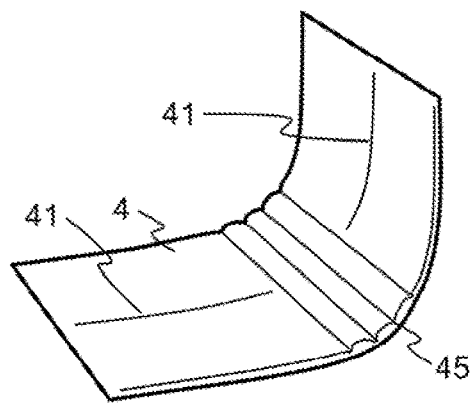
FIG. 8 a sheet of veneer bent using fold lines.

FIG. 8 shows sheet of veneer 4 being curved with a direction of maximal curvature running in parallel to the grain direction 41. Generally, most of the containers 1 described herein can also be manufactured with this orientation of the grain direction 41. However, in order to facilitate bending the veneer 4, which necessitates bending the elongated cells and channels constituting the grain of the wood, the sheet of veneer 4 is creased, generating notches or fold lines 45 that run at a right angle to the direction of maximal curvature. The fold lines 45 can be made with a creasing tool such as a crease roller or a straight edge blade compressing the veneer at one side. Creasing the veneer 4 allows to bend or fold it in a dry state.

With the embodiments shown, using a sheet of veneer 4, preferably untreated, for a main part of the structure of the container 1, allows for a significant reduction of the ecological footprint of the container 1, when considering its life cycle costs in terms of environmental impact. The environmental impact can be assessed in lifecycle cost analysis, which allocates weights to the impact of multiple aspects of a product's lifecycle and determines a footprint value in terms of environmental impact points. The environmental impact points for different variants of a product can then be compared.

While the invention has been described in present preferred embodiments of the invention, it is distinctly understood that the invention is not limited thereto, but may be otherwise variously embodied and practised within the scope of the claims.

The invention claimed is:

1. A method for shaping a sheet of wood veneer, wherein, before or in the course of shaping the veneer to form a bend, one or more of the following steps are performed:
    applying pressure to compress part of the veneer only at a side oriented towards an inside of the bend;
    applying a liquid only to a side of the veneer oriented towards an outside of the bend.

2. The method of claim 1, wherein the pressure is applied with an ultrasound sonotrode, imparting mechanical energy in the form of ultrasonic vibrations to the veneer while compressing the veneer.

3. The method of claim 1, wherein applying pressure creates an indentation or notch acting as a crease line or fold line.

4. The method of claim 1, wherein the liquid is applied in the form of steam.

5. The method of claim 4, wherein the liquid is water.

6. The method of claim 1, wherein the liquid is water.

7. The method of claim 1, being applied to shape a tubular implement as a container for food or beverages, the tubular implement comprising a sheet of wood veneer rolled to form the tubular implement in the form of a cylinder.

* * * * *